US012795424B2

(12) United States Patent
Paczkowski et al.

(10) Patent No.: US 12,795,424 B2
(45) Date of Patent: Nov. 10, 2026

(54) WIRELESS NETWORK SLICE MANAGEMENT

(71) Applicant: T-MOBILE INNOVATIONS LLC, Overland Park, KS (US)

(72) Inventors: Lyle Walter Paczkowski, Mission Hills, KS (US); Marouane Balmakhtar, Fairfax, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 420 days.

(21) Appl. No.: 18/487,643

(22) Filed: Oct. 16, 2023

(65) Prior Publication Data

US 2025/0126504 A1 Apr. 17, 2025

(51) Int. Cl.

| | |
|---|---|
| ***H04W 24/10*** | (2009.01) |
| ***H04L 41/0895*** | (2022.01) |
| ***H04L 41/40*** | (2022.01) |
| ***H04W 48/18*** | (2009.01) |

(52) U.S. Cl.

CPC ......... *H04W 24/10* (2013.01); *H04L 41/0895* (2022.05); *H04L 41/40* (2022.05); *H04W 48/18* (2013.01)

(58) Field of Classification Search

CPC ..... H04W 24/02; H04W 24/10; H04W 48/18; H04W 72/04; H04L 41/0895; H04L 41/40; H04L 43/20

See application file for complete search history.

(56) References Cited

U.S. PATENT DOCUMENTS

| | | | | |
|---|---|---|---|---|
| 10,411,964 | B2 | 9/2019 | Zhang | |
| 10,812,395 | B2 | 10/2020 | Farmanbar et al. | |
| 10,965,558 | B2 | 3/2021 | Jayakumar et al. | |
| 11,650,851 | B2 | 5/2023 | Palermo et al. | |
| 11,711,267 | B2 | 7/2023 | Parker et al. | |
| 11,888,699 | B1 * | 1/2024 | Bogineni | H04L 41/0806 |
| 2011/0149322 | A1 * | 6/2011 | Byun | G06F 9/44526 358/1.13 |
| 2013/0159512 | A1 * | 6/2013 | Groves | H04L 43/0817 709/224 |
| 2018/0123961 | A1 * | 5/2018 | Farmanbar | H04L 41/0806 |
| 2020/0412612 | A1 * | 12/2020 | Cherunni | H04L 41/0823 |
| 2021/0204154 | A1 * | 7/2021 | Li | H04L 41/0894 |
| 2022/0100247 | A1 * | 3/2022 | Garg | G06F 1/26 |
| 2022/0124560 | A1 | 4/2022 | Yeh et al. | |

(Continued)

*Primary Examiner* — Jeong S Park

(57) ABSTRACT

A wireless communication system manages a wireless network slice. The wireless communication system executes an operating system and executes wireless network slice software under the control of the operating system. The wireless communication system generates microprocessor measurement data that indicates microprocessor performance during the execution of the operating system and the wireless network slice software. The wireless communication system generates operating system measurement data that indicates operating system performance during the execution of the operating system. The wireless communication system generates wireless network slice information based on the microprocessor measurement data and the operating system measurement data. The wireless communication system modifies the execution of the wireless network slice software based on the wireless network slice information.

20 Claims, 11 Drawing Sheets

(56) References Cited

U.S. PATENT DOCUMENTS

| | | | | |
|---|---|---|---|---|
| 2022/0158912 | A1 | 5/2022 | Ikäheimo | |
| 2023/0246900 | A1* | 8/2023 | Zhang | H04L 41/044<br>709/223 |
| 2023/0336424 | A1* | 10/2023 | Wang | H04L 41/0836 |
| 2025/0016059 | A1* | 1/2025 | Krishnaswamy | H04L 41/16 |

* cited by examiner

WIRELESS NETWORK SLICE MANAGEMENT

TECHNICAL BACKGROUND

Wireless communication networks provide wireless data services to wireless communication devices like phones, computers, and other user devices. The wireless data services may include internet-access, data messaging, video conferencing, or some other data communication product. The wireless communication networks comprise wireless access nodes like Wireless Fidelity (WIFI) hotspots and Fifth Generation New Radio (5GNR) cell towers. The wireless communication networks also comprise wireless network slices. The wireless network slices have customized software that is tailored for their specific wireless data services. For example, an augmented reality device may use an Ultra-Reliable Low Latency Communication (URLLC) slice while a television device may use an enhanced Mobile Broadband (eMBB) slice.

The typical wireless network slice comprises software that executes in a data center to form a network element that transfers user data and/or controls the transfer of the user data. Exemplary network elements that are used to form wireless network slice include User Plane Functions (UPFs) and Policy Control Functions (PCFs). The data center comprises microprocessors that execute the software for the wireless network slices. The microprocessors also execute operating systems to control the execution of the slice software. Exemplary data centers include Network Function Virtualization Infrastructures and Management and Orchestration systems (MANO). Exemplary data center operating system comprise Linux and Unix.

The microprocessors include self-diagnostic tools that measure their performance. The operating systems also have diagnostic tools that measure their performance and the performance of the microprocessors. Exemplary operating system and microprocessor performance data comprises kernel identifier, software process identifier, microprocessor usage metrics, memory usage metrics, network usage metrics, instruction processing metrics, and interrupt handling metrics—although there are many more. The microprocessor usage metrics indicate the average percentage of processing resources that is used to execute a slice software process during a given time period. The memory usage metrics indicate the amount of microprocessor memory and external memory that are used to execute a slice software process during a given time period. The network usage metrics indicate the average amount data that is exchanged over a data network to execute the slice software process during a given time period. The instruction processing metrics indicate the amount of slice software instructions that are handled by the microprocessor during a given time period. The interrupt handling metrics indicate the amount of hardware interrupts and software interrupts that were handled to execute a slice software process during a given time period. Some additional performance metrics include: thread count, process count, page faults, context switches, run queue, blocked processes, server time, user time, system time. I/O wait time, idle time, the number of jobs executed, the duration of process runs, trace memory usage, server load, memory availability, files/directories, network I/O statistics, power supply rating, physical/logical drive failures, fan speed, temperature, voltage, Network Time Protocol (NTP) status, NTP server name, NTP stratum level, NTP corrections, NTP poll interval, external memory throughput, data network throughput, packets per port, packets per protocol, packets per sender/receiver, clock rate, instructions per clock, and instructions per second.

Distributed ledgers have multiple ledger nodes that perform ledger transactions in parallel. The ledger nodes validate a transaction when a consensus is reached among the nodes for the ledger transaction. The typical ledger transaction entails a smart contract that processes a data input to generate a data output. For example, a ledger may process the data inputs of a current balance and an expenditure to generate the data output of a new balance. The distributed ledger nodes each store transaction data in data blocks that also include a hash of the previous data block. Thus, the data blocks are linked by the hashes and the transaction data is immutable.

Unfortunately, the wireless communication networks do not effectively use operating system and microprocessor diagnostic tools to determine the health of a wireless network slice. Moreover, the wireless communication networks fail to efficiently use the resulting wireless network slice health data to take remedial actions like moving the wireless network slice to a new microprocessor or operating system.

TECHNICAL OVERVIEW

In some examples, a wireless network slice is managed as follows. An operating system is executed in a microprocessor. Wireless network slice software is executed in the microprocessor under the control of the operating system. Microprocessor performance is measured when executing the operating system and the wireless network slice software and corresponding microprocessor measurement data is generated. Operating system performance is measured when the operating system is executing and corresponding operating system measurement data is generated. Wireless network slice information is generated based on the microprocessor measurement data and the operating system measurement data. The execution of the wireless network slice software is modified based on the wireless network slice information.

In some examples, a Central Processing Unit (CPU) executes an operating system. The CPU executes wireless network slice software under the control of the operating system. A performance monitor obtains CPU measurement data that indicates CPU performance during the execution of the operating system and the wireless network slice software. The performance monitor obtains operating system measurement data that indicates operating system performance during the execution of the operating system. A smart contract receives the microprocessor measurement data and the operating system measurement data. The smart contract generates wireless network slice information based on the microprocessor measurement data and the operating system measurement data. The smart contract modifies the execution of the wireless network slice software based on the wireless network slice information.

In some examples, a wireless communication system manages a wireless network slice. In the wireless communication system, a microprocessor executes an operating system and executes wireless network slice software under the control of the operating system. A performance monitor system obtains microprocessor measurement data that indicates microprocessor performance during the execution of the operating system and the wireless network slice software. The performance monitor system obtains operating system measurement data that indicates operating system performance during the execution of the operating system. A network control system generates wireless network slice information based on the microprocessor measurement data and the operating system measurement data. The network control system modifies the execution of the wireless network slice software based on the wireless network slice information.

DETAILED DESCRIPTION

Figure 1:
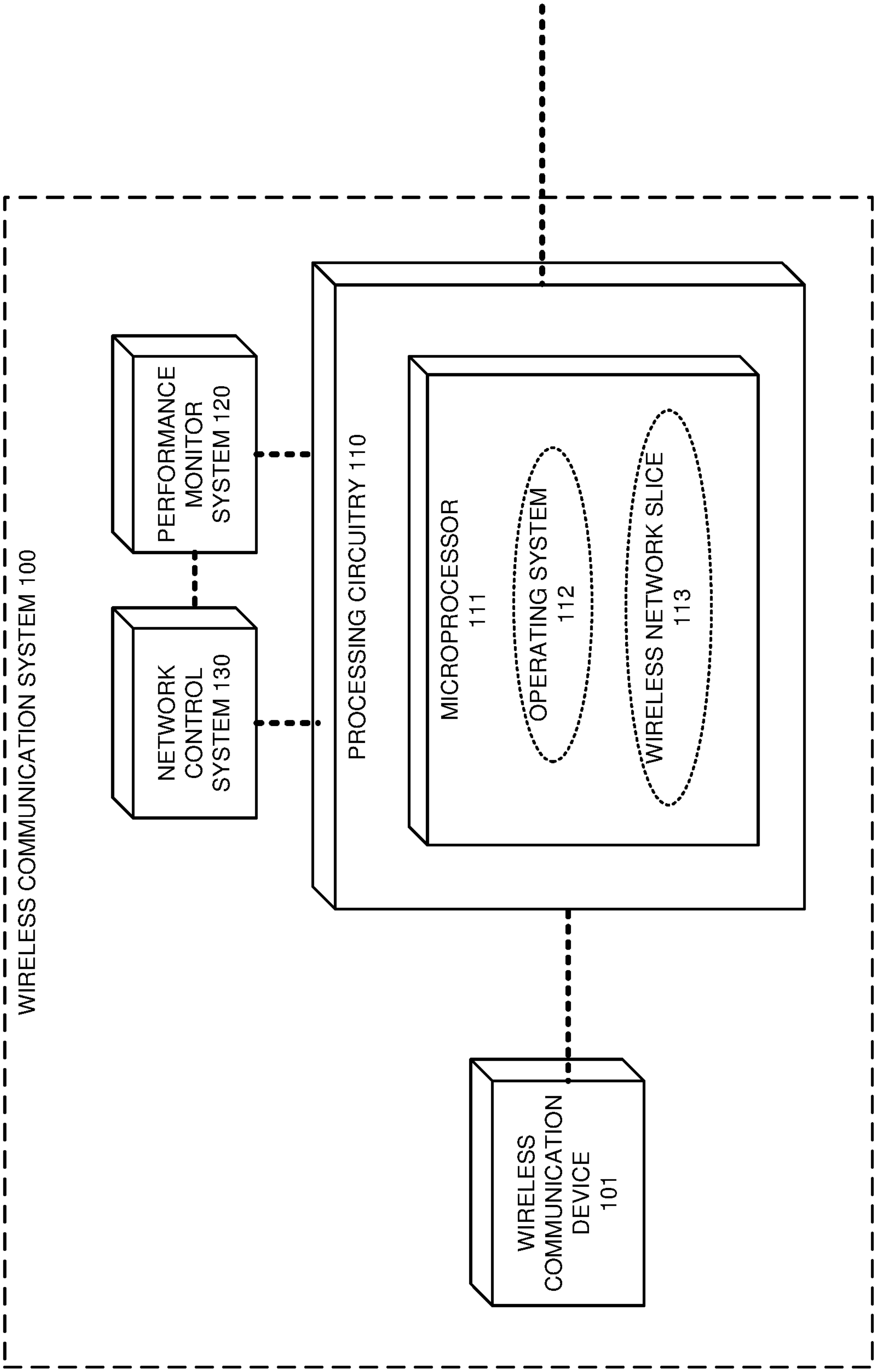
FIG. 1 illustrates an exemplary wireless communication system to manage a wireless network slice.

FIG. 1 illustrates exemplary wireless communication system 100 to manage wireless network slice 113. Wireless communication system 100 comprises wireless communication device 101, processing circuitry 110, performance monitor system 120, and network control system 130. Processing circuitry 110 comprises microprocessor 111. Microprocessor 111 executes software for operating system 112 and wireless network slice 113. Wireless communication system 100 serves wireless data services to wireless communication device 101 like internet-access, data messaging, media conferencing, or some other data communications product. The amount of wireless communication devices, microprocessors, operating systems, and slices that are shown in FIG. 1 has been restricted for clarity.

In some examples, wireless communication system 100 operates as follows. Microprocessor 111 executes operating system 112. Microprocessor 111 executes software for wireless network slice 113 under the control of operating system 112. Microprocessor 111 and operating system 112 generate microprocessor performance data that indicates the performance of microprocessor 111 when microprocessor 111 executes operating system 112 and the software for wireless network slice 113. Exemplary microprocessor measurement data comprises instruction processing metrics, memory usage metrics, and interrupt handling metrics. Microprocessor 111 and operating system 112 generate operating system performance data that indicates the performance of operating system 112 when operating system 112 is executing. Exemplary operating system measurement data comprises kernel identifier, software process identifier, microprocessor usage metrics, memory usage metrics, and network usage metrics.

Performance monitor system 120 obtains the microprocessor performance data and the operating system performance data from operating system 112. For example, performance monitor system 120 may make Application Programming Interface (API) calls to operating system 112 for the performance data. Performance monitor system 120 transfers the microprocessor measurement data and the operating system measurement data to network control system 130.

Network control system 130 generates wireless network slice information based on the microprocessor measurement data and the operating system measurement data. Network control system 130 modifies the execution of the software for wireless network slice 113 based on the wireless network slice information. For example, a smart contract in a distributed ledger may generate wireless network slice information based on the microprocessor measurement data and the operating system measurement data. The smart contract may then direct a Management and Orchestration (MANO) system to control a Network Function Virtualization Infrastructure (NFVI) to stop the execution of the software for wireless network slice 113. The MANO system may direct the NFVI to use a different microprocessor and/or operating system to execute the software for wireless network slice 113.

Wireless communication device 101 comprises a phone, computer, vehicle, sensor, or some other user communication apparatus. Wireless communication system 100 comprises wireless access nodes, network controllers, data routers, and/or some other wireless communication apparatus. Wireless communication device 101 and wireless communication system 100 comprise one or more radios that wirelessly communicate using wireless protocols like Wireless Fidelity (WIFI), Fifth Generation New Radio (5GNR), Long Term Evolution (LTE), Low-Power Wide Area Network (LP-WAN), Near-Field Communications (NFC), Code Division Multiple Access (CDMA), Frequency Division Multiple Access (FDMA), Time Division Multiple Access (TDMA), and satellite data communications.

Wireless communication device 101, processing circuitry 110, performance monitor system 120, and network control system 130 comprise microprocessors, software, memories, transceivers, bus circuitry, and/or some other data processing components. The microprocessors comprise Digital Signal Processors (DSP), Central Processing Units (CPU), Graphical Processing Units (GPU), Application-Specific Integrated Circuits (ASIC), and/or some other data processing hardware. The memories comprise Random Access Memory (RAM), flash circuitry, disk drives, and/or some other type of data storage. The memories store software like operating systems, utilities, protocols, applications, and functions. The microprocessors retrieve the software from the memories and execute the software to drive the operation of wireless communication system 100 as described herein.

Figure 2:
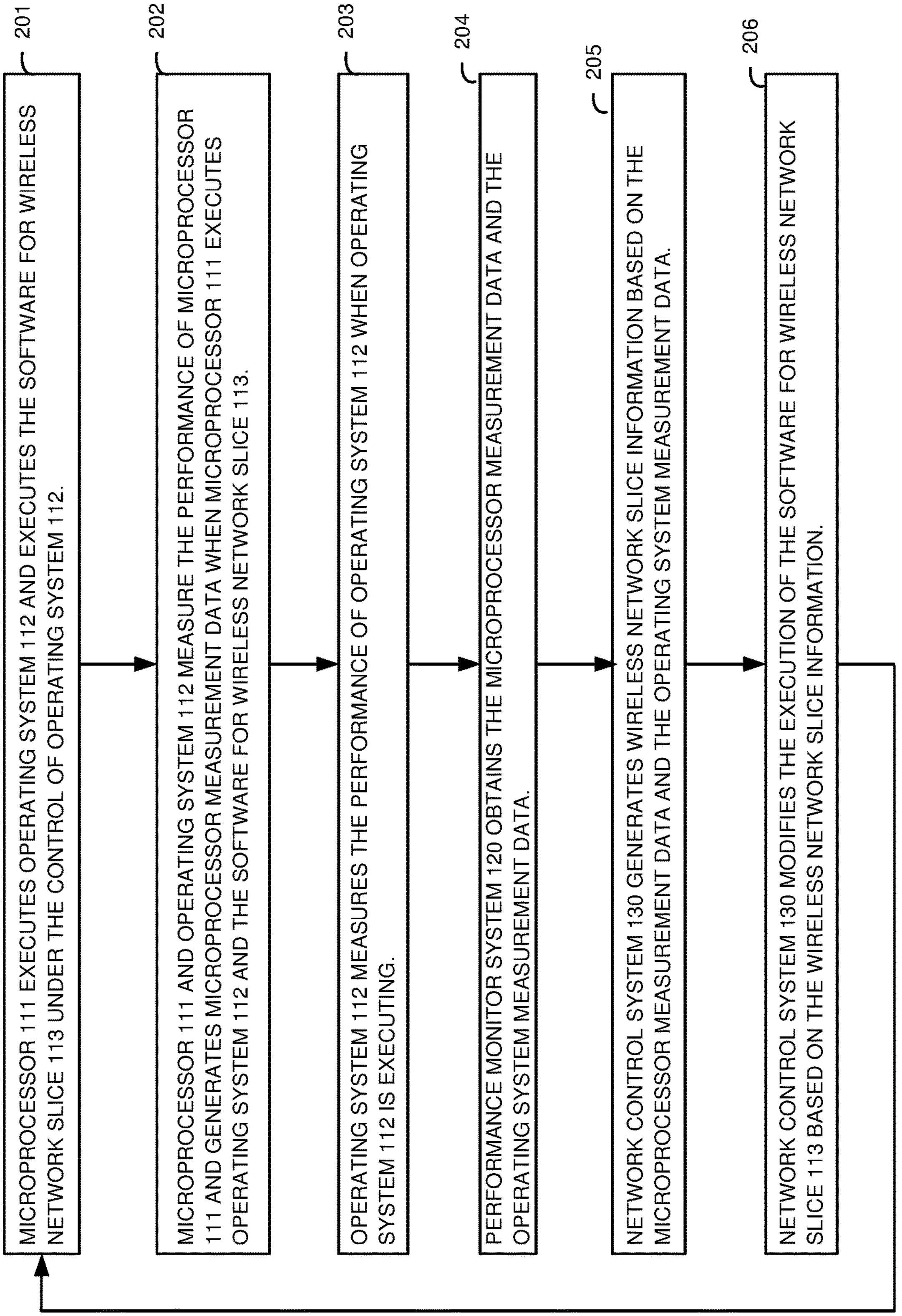
FIG. 2 illustrates an exemplary operation of the wireless communication system to manage the wireless network slice.

FIG. 2 illustrates an exemplary operation of wireless communication system 100 to manage wireless network slice 113. The operation may differ in other examples. Microprocessor 111 executes operating system 112 and executes the software for wireless network slice 113 under the control of operating system 112 (201). Microprocessor 111 and operating system 112 measure the performance of microprocessor 111 when microprocessor 111 executes operating system 112 and the software for wireless network slice 113 (202). Operating system 112 measures the performance of operating system 112 when operating system 112 is executing (203). Performance monitor system 120 obtains microprocessor performance data that indicates the performance of microprocessor 111 when microprocessor 111 executes operating system 112 and the software for wireless network slice 113 (204). Performance monitor system 120 obtains operating system performance data that indicates the performance of operating system 112 when operating system 112 is executing (204). Network control system 130 generates wireless network slice information based on the microprocessor measurement data and the operating system measurement data (205). Network control system 130 modifies the execution of the software for wireless network slice 113 based on the wireless network slice information (206). The operation repeats (201).

Figure 3:
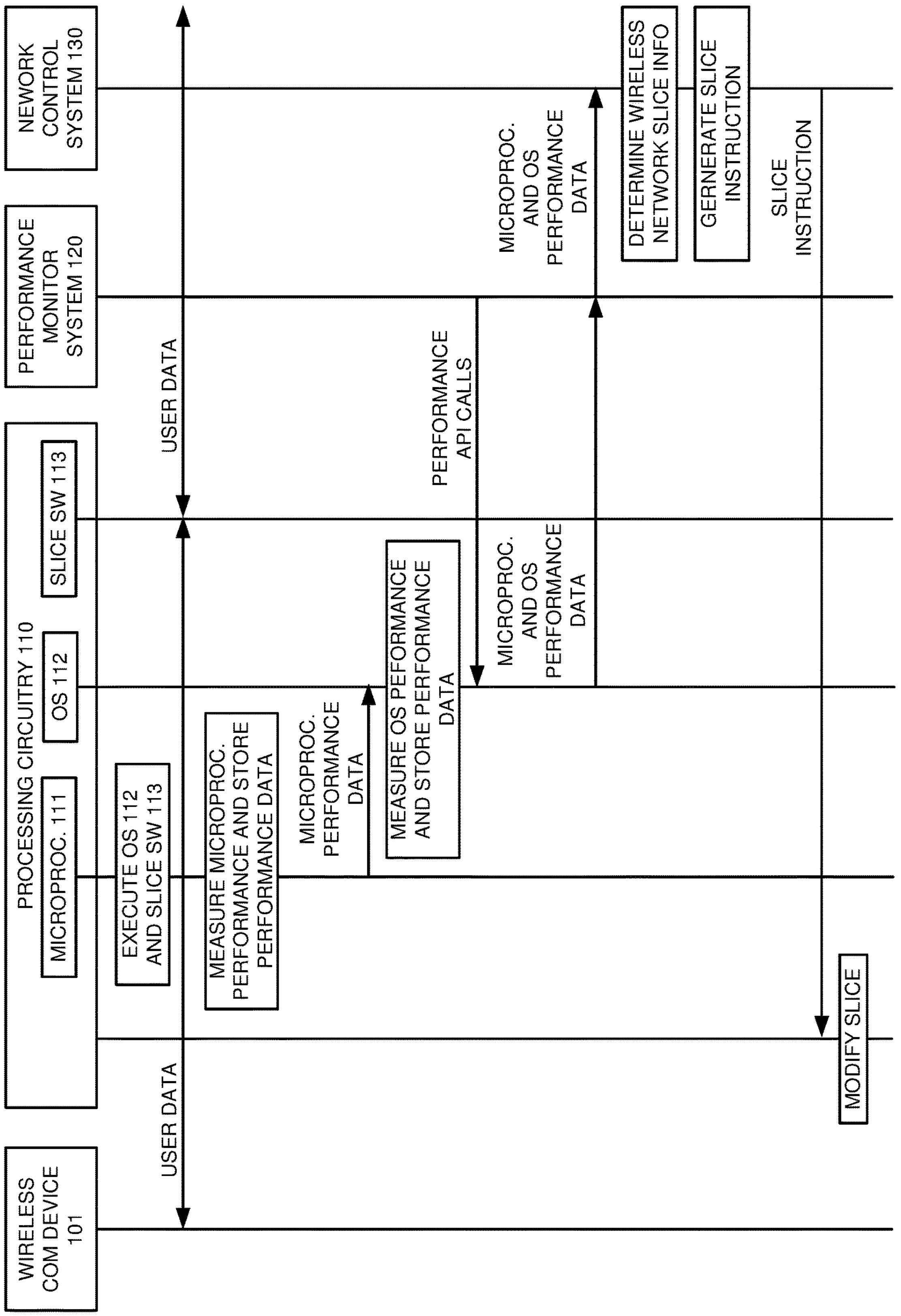
FIG. 3 illustrates an exemplary operation of the wireless communication system to manage the wireless network slice.

FIG. 3 illustrates an exemplary operation of wireless communication system 100 to manage wireless network slice 113. The operation may differ in other examples. Microprocessor 111 executes operating system (OS) 112. Microprocessor 111 executes the software for wireless network slice 113 under the control of operating system 112. Microprocessor 111 measures microprocessor performance and stores microprocessor performance data. Operating system 112 reads the microprocessor performance data from microprocessor 111. Operating system 112 measures operating system performance and stores operating system performance data.

Performance monitor system 120 transfers performance Application Programming Interface (API) calls to operating system 112. Operating system 112 transfers the microprocessor data and operating system performance data to performance monitor system 120 in response to the API calls. Performance monitor system 120 transfers the microprocessor measurement data and the operating system measurement data to network control system 130. Network control system 130 generates wireless network slice information based on the microprocessor measurement data and the operating system measurement data. Network control system 130 generates a slice instruction based on the wireless network slice information. Network control system 130 transfers the slice instruction to processing circuitry 110. Processing circuitry 110 modifies the execution of the software for wireless network slice 113 in response to the wireless network slice instruction.

Advantageously, wireless communication system 100 effectively uses operating system and microprocessor diagnostic tools to determine the health of wireless network slice 113. Moreover, the wireless communication system 100 efficiently uses the resulting wireless network slice information to take remedial actions like moving software for wireless network slice 113 to a new microprocessor or operating system.

Figure 4:
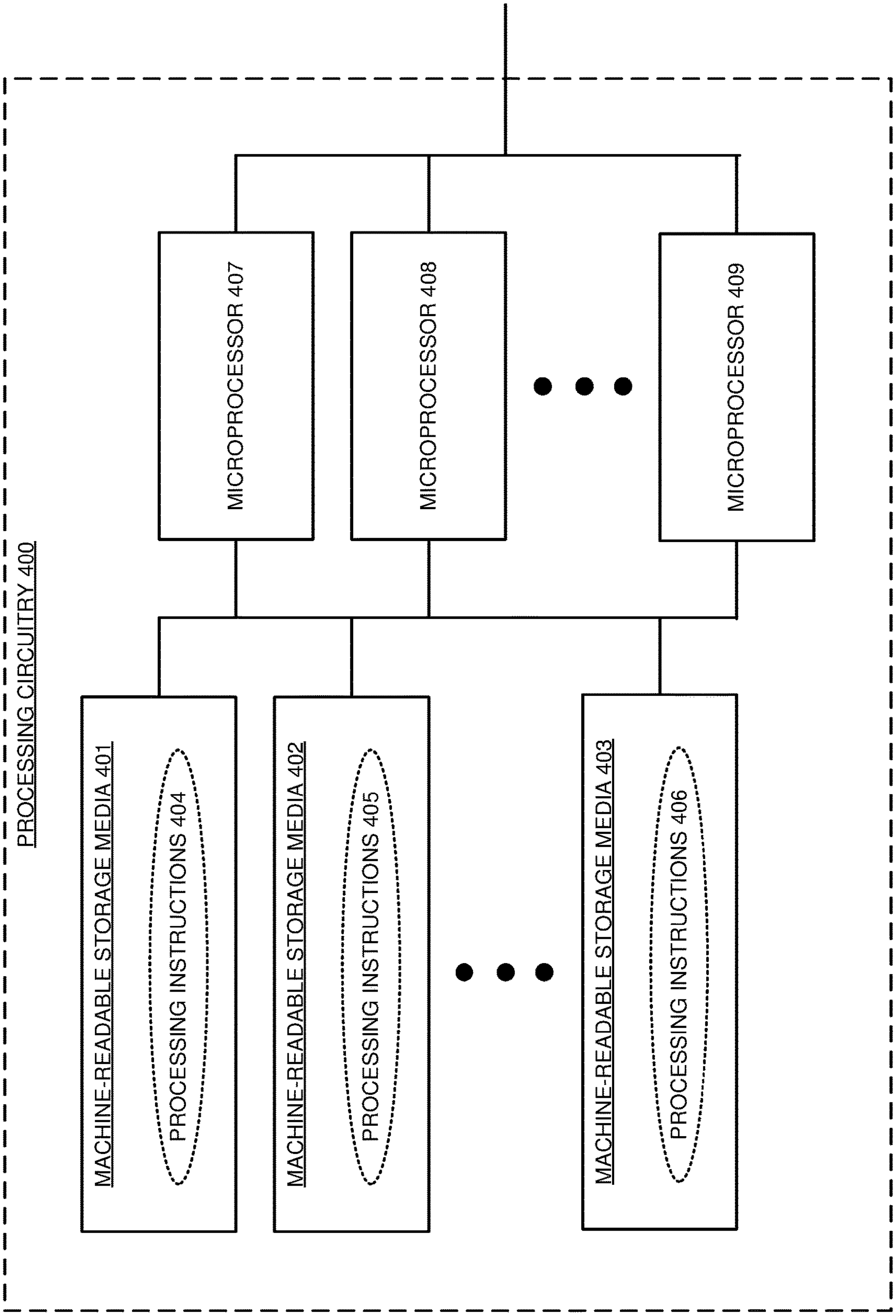
FIG. 4 illustrates exemplary processing circuitry to manage a wireless network slice.

FIG. 4 illustrates exemplary processing circuitry 400 to manage a wireless network slice. Processing circuitry 400 comprises an example of circuitry 110, performance monitor system 120, and network control system 130, although circuitry 110 and systems 120/130 may differ. Processing circuitry 400 comprises machine-readable storage media 401-403 and microprocessors 407-409 that are communicatively coupled. Machine-readable storage media 401-403 store processing instructions 404-406 in a non-transitory manner. Microprocessors 407-409 comprise DSPs, CPUs, GPUs, ASICs, and/or some other data processing hardware. Machine-readable storage media 401-403 comprises RAM, flash circuitry, disk drives, and/or some other type of data storage apparatus. Microprocessors 407-409 retrieve processing instructions 404-406 from non-transitory machine-readable storage media 401-403. Microprocessors 407-409 execute processing instructions 404-406 to manage the execution of software for a wireless network slice as described above for wireless communication system 100 and as described below for wireless communication network 500. The amount of storage media, microprocessors, processing instructions that are shown in FIG. 4 is exemplary and may vary in other examples.

Figure 5:
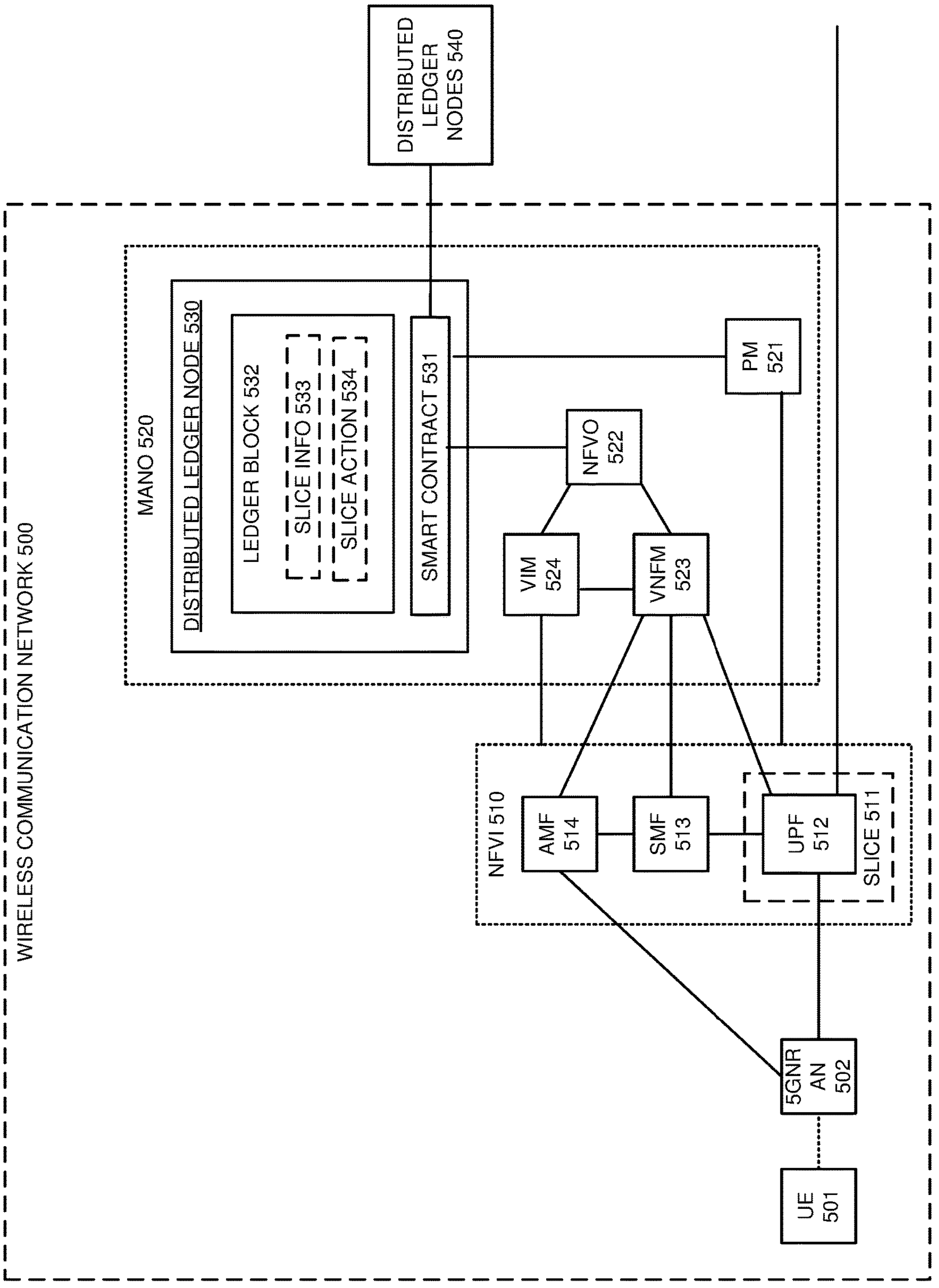
FIG. 5 illustrates an exemplary wireless communication network to manage a wireless network slice.

FIG. 5 illustrates exemplary wireless communication network 500 to manage wireless network slice 511 that comprises User Plane Function (UPF) 512. Wireless communication network 500 comprises an example of wireless communication system 100 and processing circuitry 400, although system 100 and circuitry 400 may differ. Wireless communication network 500 comprises User Equipment (UE) 501, Fifth Generation New Radio Access Node (5GNR AN) 502, Network Function Virtualization Infrastructure (NFVI) 510 and Management and Orchestration (MANO) 520. NFVI 510 comprises wireless network slice 511, Session Management Function (SMF) 513, and Access and Mobility Management Function (AMF) 514. Wireless network slice 511 comprises User Plane Function (UPF) 512. MANO 520 comprises Performance Monitor (PM) 521, Network Function Virtualization Orchestrator (NFVO) 522, Virtual Network Function Manager (VNFM) 523, Virtual Infrastructure Manager (VIM) 524, and distributed ledger node 530. Distributed ledger node 530 comprises smart contract 531 and ledger block 532. Ledger block 532 comprises slice information 533 and slice action 534. Distributed ledger node 530 communicates with other distributed ledger nodes 540.

A CPU or GPU (CPU/GPU) in NFVI 510 executes an operating system. The CPU/GPU also executes UPF 512 for slice 511 under the control of the operating system. The term CPU/GPU refers to the CPU or GPU that executes UPF 512. PM 521 calls the operating system for operating system performance data and for CPU/GPU performance data for UPF 512. The CPU/GPU and the operating system measure their performance, and the operating system reports corresponding CPU/GPU metrics and operating system metrics for UPF 512 to PM 521.

Exemplary CPU/GPU metrics comprises instruction processing metrics, memory usage metrics, and interrupt handling metrics. The instruction processing metrics indicates the amount of UPF 512 instructions that are handled by the CPU/GPU during a given time period. The memory usage metrics indicate the amount of memory used by CPU/GPU to execute UPF 512 during a given time period. The interrupt handling metrics indicate the amount of hardware interrupts that were handled to execute UPF 512 during a given time period. Exemplary operating system metrics data comprise kernel identifier, software process identifier, microprocessor usage metrics, memory usage metrics, and network usage metrics. The microprocessor usage metrics indicate the average percent of CPU/GPU processing that is used to execute UPF 512. The memory usage metrics indicate the average percent of internal memory and the average percent of external memory that are used to execute UPF 512. The network usage metrics indicate the average amount data that is exchanged over Network Interface Cards (NICs) to execute UPF 512. Some additional performance metrics include: thread count, process count, page faults, context switches, run queue, blocked processes, server time, user time, system time, I/O wait time, idle time, the number of jobs executed, the duration of process runs, trace memory usage, server load, memory availability, files/directories, network I/O) statistics, power supply rating, physical/logical drive failures, fan speed, temperature, voltage, Network Time Protocol (NTP) status, NTP server name, NTP stratum level. NTP corrections, NTP poll interval, external memory throughput, data network throughput, packets per port, packets per protocol, packets per sender/receiver, clock rate, instructions per clock, and instructions per second.

Smart contract 531 generates wireless network slice information 533 based on the CPU/GPU metrics and the operating system metrics. For example, smart contract 531 may generate a slice health score based on the metrics by comparing the metrics to thresholds and ranges to determine how close the execution of UPF 512 is to expected healthy results. The slice health score may have a CPU/GPU component and operating system component that are combined into a data string. The CPU/GPU component might equal (the instruction processing metric−a healthy instruction level)+(the memory usage metric−a healthy memory level)+(the interrupt handling metric−a healthy interrupt level). The OS component may equal (the microprocessor usage metric−a healthy microprocessor level)+(the memory usage metric−a healthy memory level)+(the network usage metric−a healthy network level). To illustrate a CPU/GPU health score, a CPU/GPU metric that indicates that the CPU/GPU is using far less instructions per second to execute UPF 512 than a healthy slice would require indicates an unhealthy CPU/GPU. To illustrate an operating system health score, an operating system metric that indicates that the operating system is using far more network I/O to execute UPF 512 than a healthy slice would require indicates an unhealthy operating system.

After reaching a consensus on wireless network slice information 533 with the smart contracts in distributed ledger nodes 540, smart contract 531 stores wireless network slice information 533 in ledger block 532 and determines slice action 534 (if any) based on wireless network slice information 533. For example, smart contract 531 may determine the need to stop the execution of UPF 512 when the slice health score exceeds health thresholds for both the CPU/GPU and the OS. Smart contract 531 may determine the need to use a different CPU/GPU for UPF 512 when the slice health score exceeds the health threshold for the CPU/GPU but not the OS. Smart contract 531 may determine the need to use a different OS for UPF 512 when the slice health score exceeds the health threshold for the OS but not the CPU/GPU.

After reaching a consensus on slice action 534 with the smart contracts in distributed ledger nodes 540, smart contract 531 stores slice action 534 in ledger block 532 and transfers slice action 534 to NFVO 522. NFVO 522 converts slice action into an NFVI instruction in manner similar to the conversion of Operational Support System (OSS) instructions into NFVI instructions. NFVO 522 transfers the NFVI instruction for UPF 512 to VIM 524. VIM 524 transfers the NFVI instruction for UPF 512 to NFVI 510. In response to the NFVI instruction, NFVI 510 implements the slice action. For example, NFVI 510 may stop the execution of UPF 512, use a different CPU/GPU for UPF 512, or use a different operating system for UPF 512.

Figure 6:
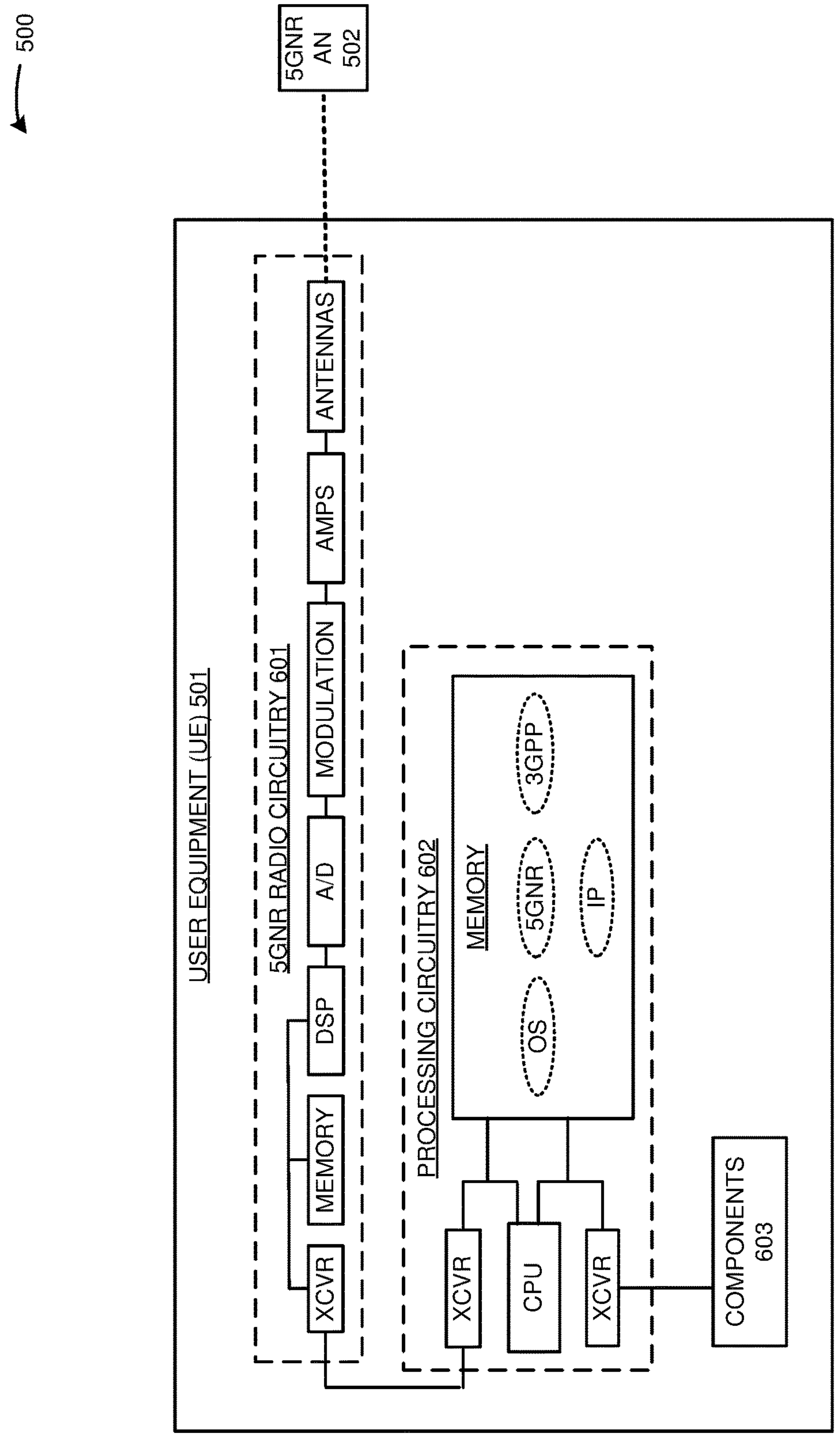
FIG. 6 illustrates an exemplary UE in the wireless communication network that manages the wireless network slice.

FIG. 6 illustrates exemplary UE 501 in wireless communication network 500 that manages wireless network slice 511 that comprises UPF 512. UE 501 comprises an example of wireless communication device 101, although device 101 may differ. UE 501 Fifth Generation New Radio (5GNR) radio circuitry 601, processing circuitry 602, and components 603. 5GNR radio circuitry 601 comprises antennas, amplifiers, filters, modulation, analog-to-digital interfaces, DSPs, memories, and transceivers (XCVRs) that are coupled over bus circuitry. Processing circuitry 602 comprises one or more CPUs, one or more memories, and one or more transceivers that are coupled over bus circuitry. Components 603 comprise sensors, cameras, medical devices, and/or some other user apparatus. The one or more memories in processing circuitry 602 store software like an Operating System (OS), 5GNR application (5GNR), 3GPP application (3GPP), and Internet Protocol application (IP). The antennas in 5GNR radio circuitry 601 exchange 5GNR signals with 5GNR AN 502. Transceivers in 5GNR radio circuitry 601 are coupled to transceivers in processing circuitry 602. In processing circuitry 602, the one or more CPU/GPUs retrieve the software from the one or more memories and execute the software to direct the operation of UE 501 as described herein.

Figure 7:
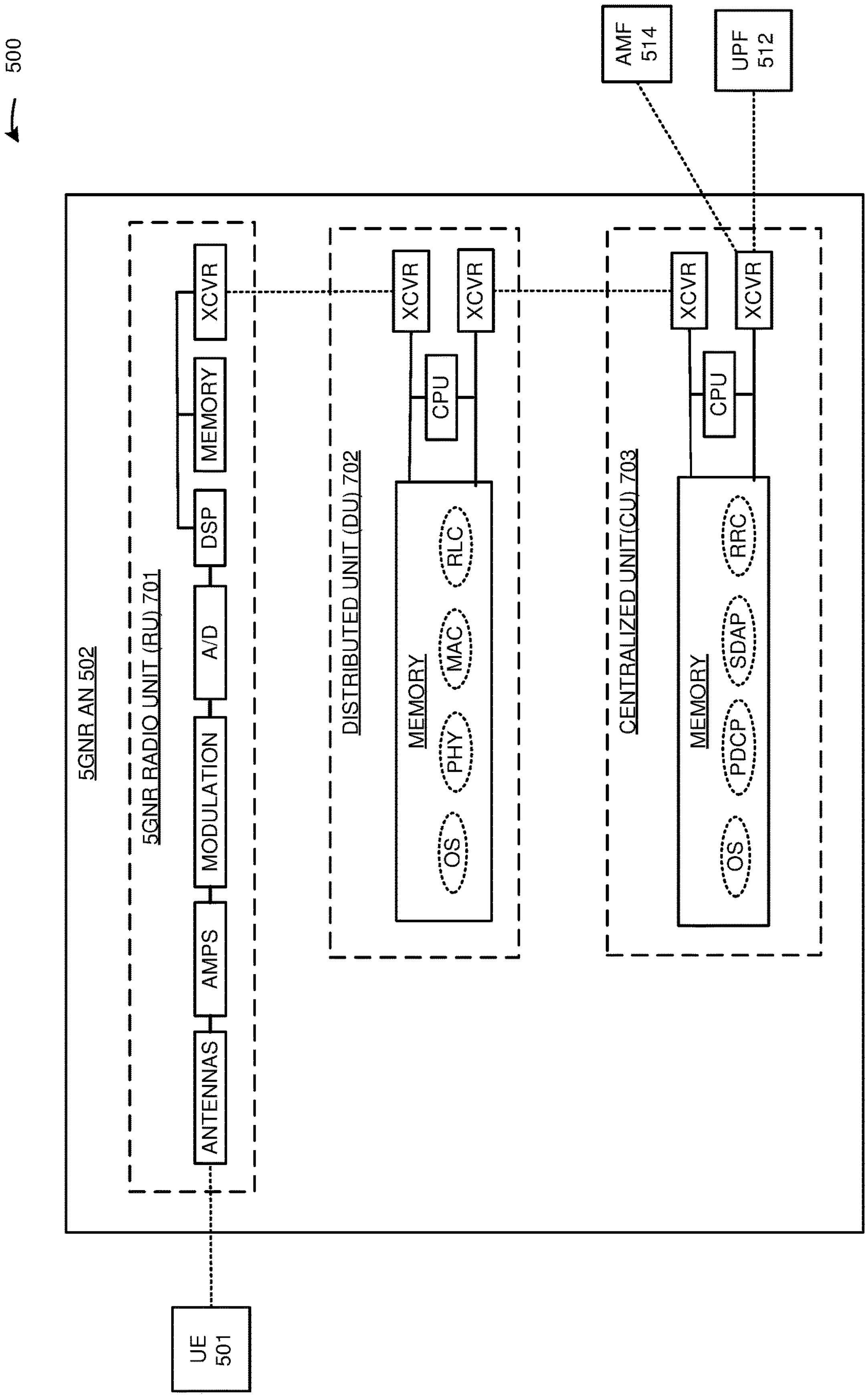
FIG. 7 illustrates an exemplary Fifth Generation New Radio (5GNR) access node in the wireless communication network that manages the wireless network slice.

FIG. 7 illustrates exemplary Fifth Generation New Radio Access Node (5GNR AN) 502 in wireless communication network 500 that manages wireless network slice 511 that comprises UPF 512. 5GNR AN 502 comprises an example of wireless communication system 100 and processing circuitry 400, although system 100 and circuitry 400 may differ. 5GNR AN 502 comprises 5GNR Radio Unit (RU) 701, Distributed Unit (DU) 702, and Centralized Unit (CU) 703. 5GNR RU 701 comprises antennas, amplifiers, filters, modulation, analog-to-digital interfaces, DSP, memory, radio applications, and transceivers that are coupled over bus circuitry. DU 702 comprises memory, CPU, user interfaces and components, and transceivers that are coupled over bus circuitry. The memory in DU 702 stores operating system and 5GNR network applications for Physical Layer (PHY), Media Access Control (MAC), and Radio Link Control (RLC). CU 703 comprises memory, CPU, and transceivers that are coupled over bus circuitry. The memory in CU 703 stores an operating system and 5GNR network applications for Packet Data Convergence Protocol (PDCP), Service Data Adaption Protocol (SDAP), and Radio Resource Control (RRC). The antennas in 5GNR RU 701 are wirelessly coupled to UE 501 over 5GNR links. Transceivers in 5GNR RU 701 are coupled to transceivers in DU 702. Transceivers in DU 702 are coupled to transceivers in CU 703. Transceivers in CU 703 are coupled to AMF 514 and UPF 512. The DSP and CPU in RU 701, DU 702, and CU 703 execute the radio applications, operating systems, and network applications to exchange data and signaling with UE 501, AMF 514, and UPF 512 as described herein.

Figure 8:
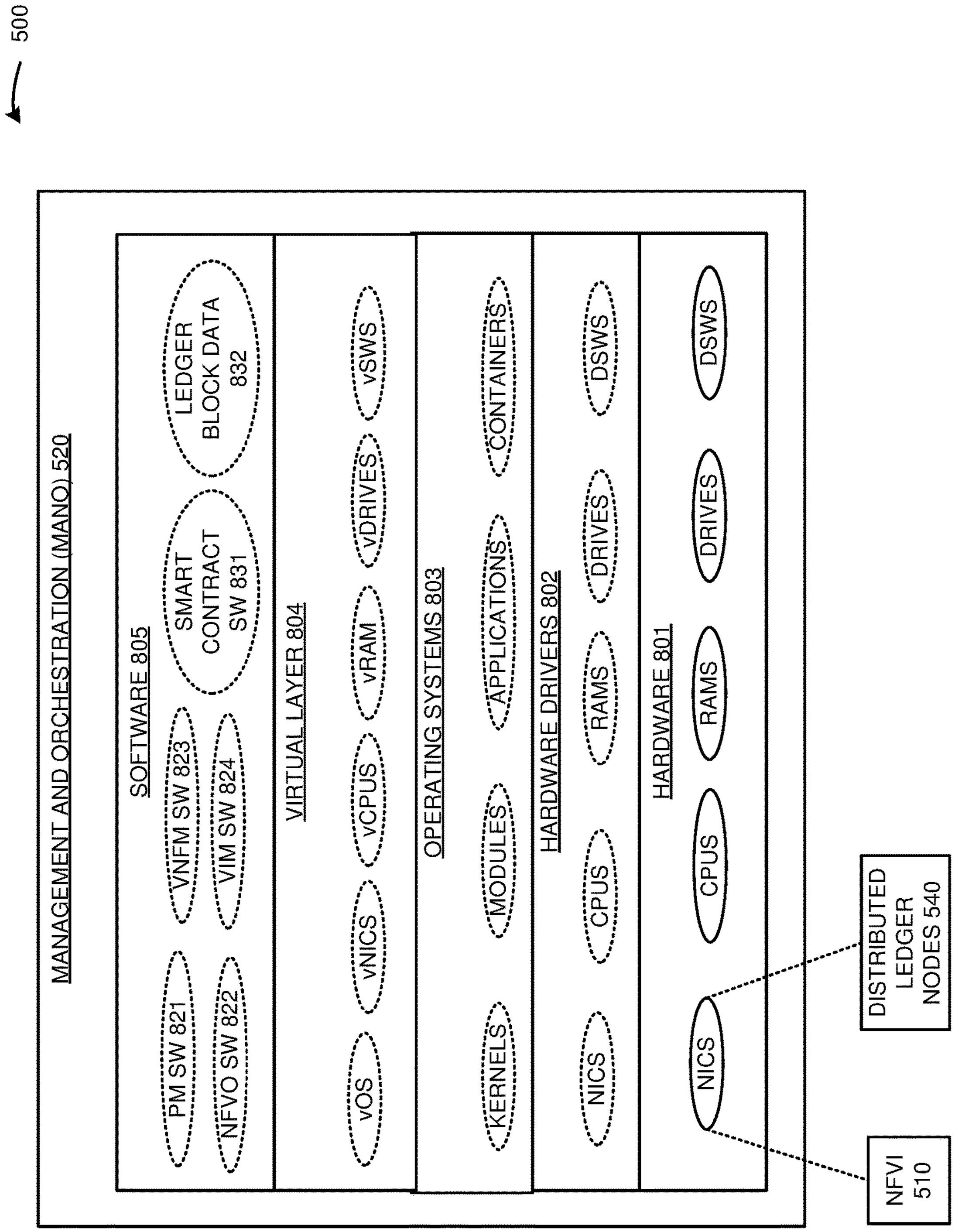
FIG. 8 illustrates an exemplary Management and Orchestration (MANO) system in the wireless communication network that manages the wireless network slice.

FIG. 8 illustrates exemplary Management and Orchestration (MANO) 520 in wireless communication network 500 that manages the wireless network slice 511 that comprises the UPF 512. MANO 520 comprises an example of network control system 130 and circuitry 400, although system 130 and circuitry 400 may differ. MANO 520 comprises hardware 801, hardware drivers 802, operating systems 803, virtual layer 804, and Software (SW) 805. Hardware 801 comprises Network Interface Cards (NICs), CPU, RAM, Flash/Disk Drives (DRIVE), and Data Switches (DSW). Hardware drivers 802 comprise software that is resident in the NIC, CPU, RAM, DRIVE, and DSW. Operating systems 803 comprise kernels, modules, applications, and containers. Virtual layer 804 comprises vNIC, vCPU, vRAM, vDRIVE, and vSW. SW 805 comprises PM SW 821, NFVO SW 822, VNFM SW 823, VIM SW 824, smart contract SW 831, and ledger block data 832. The NIC in NF hardware 801 are coupled to NFVI 510 and distributed ledger nodes 540. Hardware 801 executes hardware drivers 802, operating systems 803, virtual layer 804, and SW 805 to form and operate PM 521, NFVO 522, VNFM 523, VIM 524, and smart contract 531. The DRIVE in hardware 801 comprises the memory for ledger block data 832. Thus, MANO 520 comprises one or more microprocessors and one or more non-transitory machine-readable storage media that store processing instructions that direct MANO 520 to perform the methods described herein. MANO 520 may be located at a single site or be distributed across multiple geographic locations.

Figure 9:
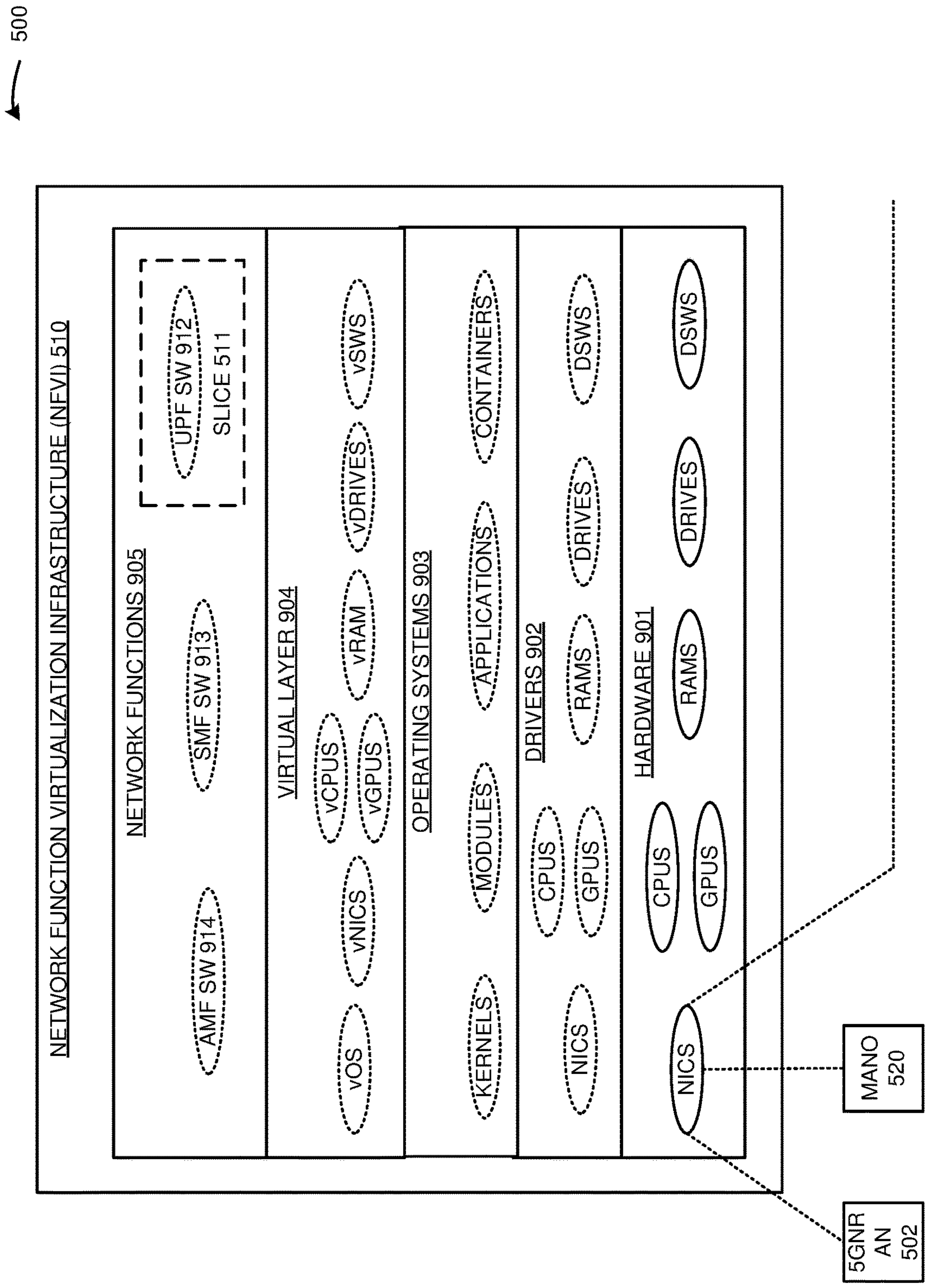
FIG. 9 illustrates an exemplary Network Function Virtualization Infrastructure (NFVI) in the wireless communication network that manages the wireless network slice.

FIG. 9 illustrates exemplary Network Function Virtualization Infrastructure (NFVI) 510 in wireless communication network 500 that manages wireless network slice 511 that comprises UPF 512. NFVI 510 comprises an example of processing circuitry 110 and 400, although circuitry 110 and 400 may differ. NFVI 510 comprises hardware 901, hardware drivers 902, operating systems 903, virtual layer 904, and SW 905. Hardware 901 comprises NICs, CPU, GPU, RAM, DRIVE, and DSW. Hardware drivers 902 comprise software that is resident in the NIC, CPU, GPU, RAM, DRIVE, and DSW. Operating systems 903 comprise kernels, modules, applications, and containers. Virtual layer 904 comprises vNIC, vCPU, vGPU, vRAM, vDRIVE, and vSW. SW 905 comprises AMF SW 914, SMF SW 913, and UPF SW 912 for slice 511. The NIC in hardware 901 are coupled to 5GNR AN 502, MANO 520, and external systems. Hardware 901 executes hardware drivers 902, operating systems 903, virtual layer 904, and SW 905 to form and operate AMF 514, SMF 513, and UPF 512 in slice 511. NFVI 510 comprises one or more microprocessors and one or more non-transitory machine-readable storage media that store processing instructions that direct NFVI 510 to perform the methods described herein. NFVI 510 may be located at a single site or be distributed across multiple geographic locations.

One of the CPU/GPUs in hardware 901 executes one of operating systems 903 and executes UPF SW 912 under the control of that operating system. The operating system reads CPU/GPU metrics from registers in this CPU/GPU. The operating system also determines operating system metrics. The operating system reports the CPU/GPU metrics and the operating system metrics to PM SW 821 in MANO 520 in response to API calls from PM SW 821.

Figure 10:
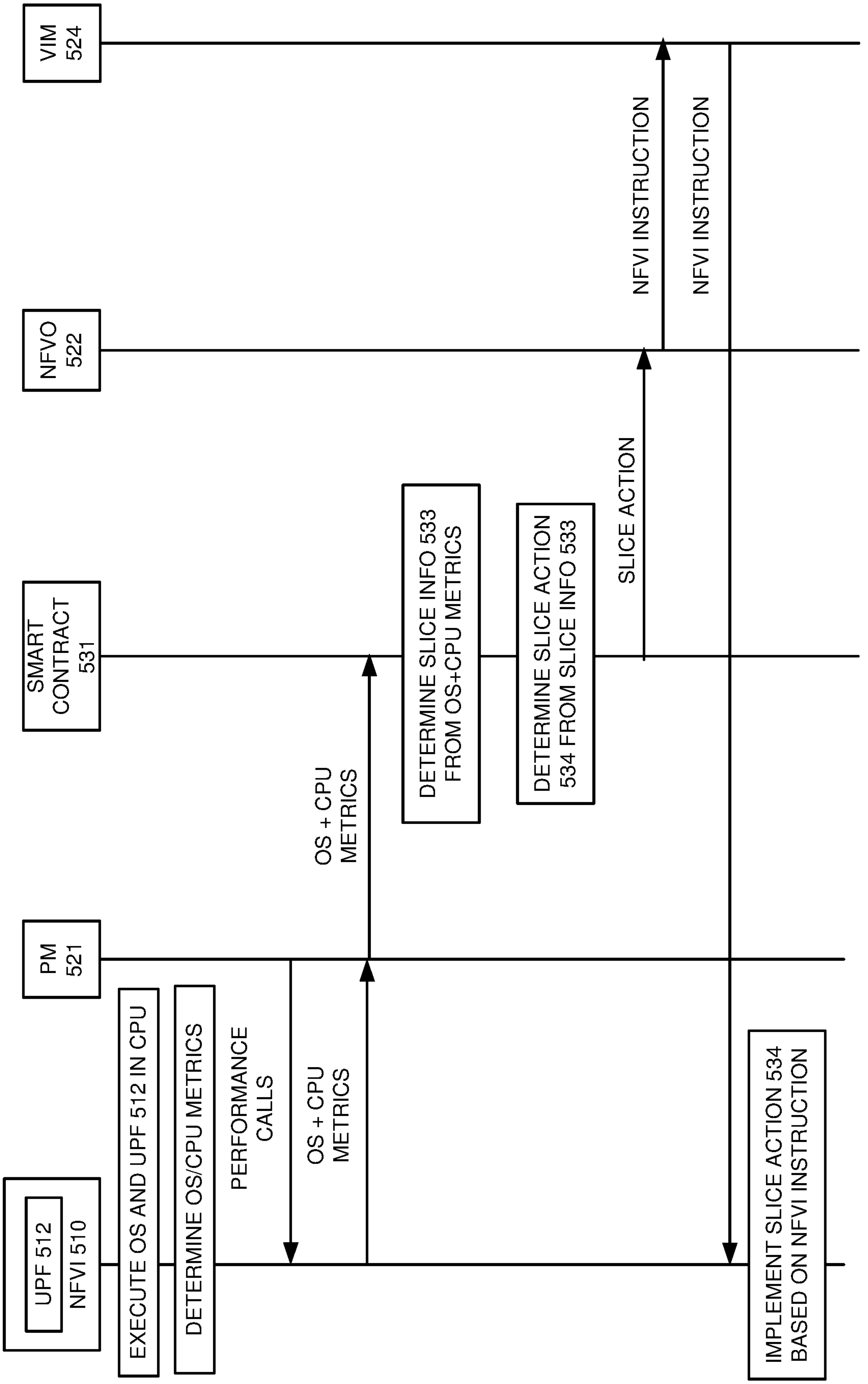
FIG. 10 illustrates an exemplary operation of the wireless communication network that manages the wireless network slice.

FIG. 10 illustrates an exemplary operation of wireless communication network 500 to manage wireless network slice 511 that comprises UPF 512. The operation may differ in other examples. NFVI 510 executes an operating system and UPF 512 in a CPU/GPU under the control of the operating system. PM 521 makes CPU/GPU and OS performance calls to the operating system in NFVI 510 for UPF 511 in slice 512. The CPU/GPU and the operating system measure their performance, and the operating system reports corresponding CPU/GPU and operating system metrics to PM 521. Exemplary CPU/GPU metrics comprises instruction processing metrics, memory usage metrics, and interrupt handling metrics. The instruction processing metrics indicates the amount of UPF 512 instructions that are handled by the CPU/GPU per time period. The memory usage metrics indicate the amount of memory used by CPU/GPU to execute UPF 512 per time period. The interrupt handling metrics indicate the amount of hardware interrupts that were handled to execute UPF 512 per time period. Exemplary operating system metrics data comprise microprocessor usage metrics, memory usage metrics, and network usage metrics. The microprocessor usage metrics indicate the average percent of CPU/GPU processing that is used to execute UPF 512 during a time period. The memory usage metrics indicate the average percent of internal memory and the average percent of external memory that is used to execute UPF 512 during a time period. The network usage metrics indicate the average amount data that is exchanged over Network Interface Cards (NICs) to execute UPF 512 during a time period.

PM 521 transfers the OS and CPU/GPU performance metrics to smart contract 531. Smart contract 521 determines wireless network slice information 533 based on the OS and CPU/GPU metrics. For example, smart contract 531 may generate a slice health score based on the metrics by comparing the metrics to healthy thresholds and ranges to determine how close the execution of UPF 512 is to expected healthy results. A CPU/GPU metric that indicates that the CPU/GPU is using far less instructions per second to execute UPF 512 than a healthy slice would require indicates an unhealthy CPU/GPU. An operating system metric that indicates that the operating system is using far more network I/O to execute UPF 512 than a healthy slice would require indicates an unhealthy operating system. The slice health score may have a CPU/GPU component, and an operating system component.

After reaching a consensus on wireless network slice information 533 with distributed ledger nodes 540 (not shown on FIG. 10), smart contract 531 determines a slice action 534 based on wireless network slice information 533. For example, smart contract 533 may determine the need to stop the execution of UPF 512 when both OS and CPU/GPU metrics are unhealthy. Smart contract 533 may determine the need use a different CPU/GPU when the CPU/GPU metrics are unhealthy but the OS metrics are healthy. Smart contract 533 may determine the need use a different OS when the OS metrics are unhealthy but the CPU/GPU metrics are healthy. After reaching a consensus on slice action 534 with distributed ledger nodes 540 (not shown on FIG. 10, smart contract 531 indicates slice action 534 to NFVO 522. NFVO 522 converts slice action 534 for UPF 512 into an NFVI instruction and transfers the NFVI instruction for UPF 512 to VIM 524. VIM 524 transfers the NFVI instruction for UPF 512 to NFVI 510. In response to the NFVI instruction, NFVI 510 implements slice action 534. For example, NFVI 510 may stop the execution of UPF 512, use a different CPU/GPU for UPF 512, or use a different operating system for UPF 512.

Figure 11:
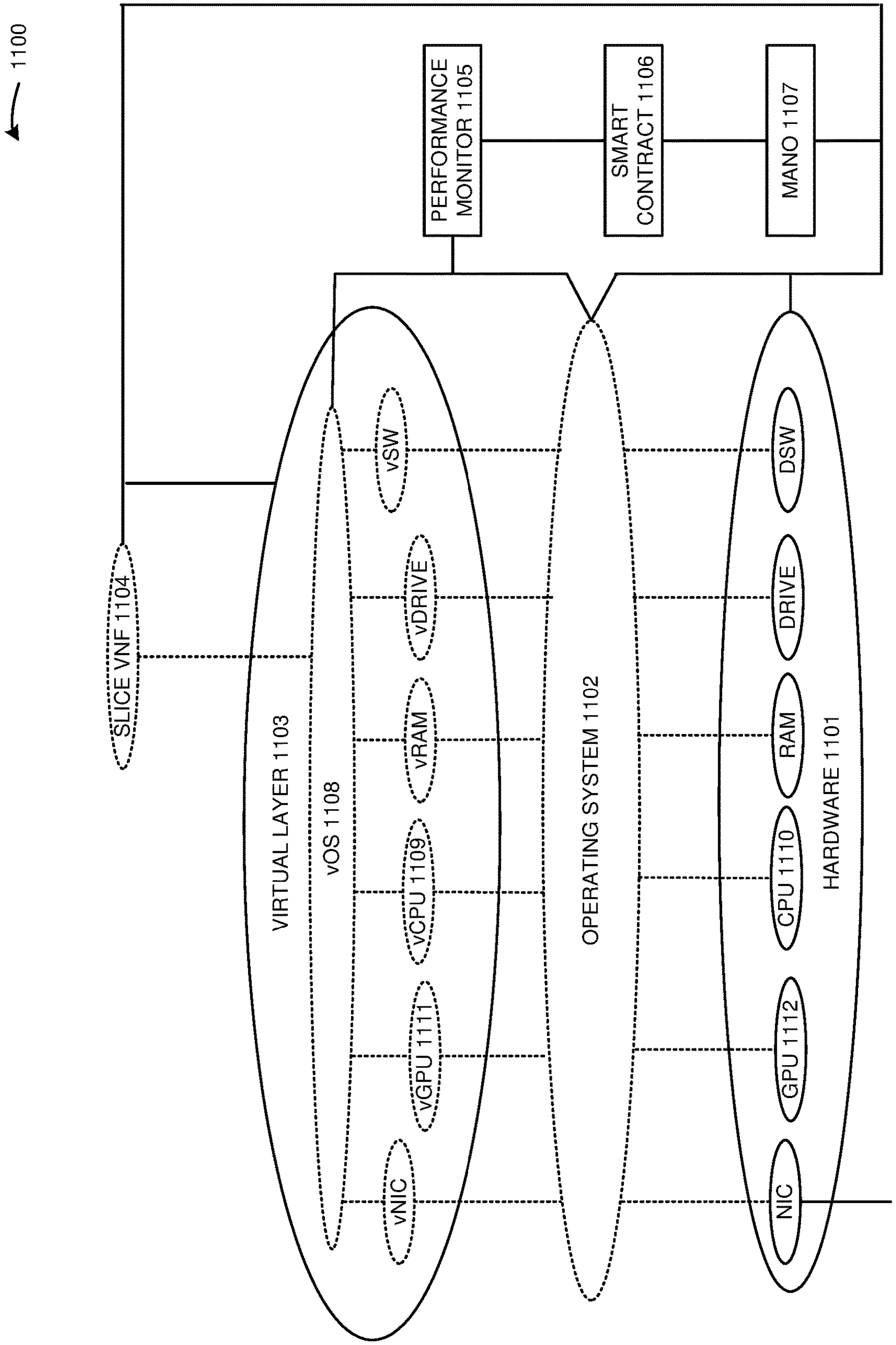
FIG. 11 illustrates an exemplary MANO/NFVI system to manage a wireless network slice Virtual Network Function (VNF).

FIG. 11 illustrates exemplary MANO/NFVI system 1100 to manage wireless network slice Virtual Network Function (VNF) 1104. MANO/NFVI system 1100 comprises an example of wireless communication system 100, processing circuitry 400, NFVI 510, and MANO 520, although system 100, circuitry 400, NFVI 510, and MANO 520 may differ. MANO/NFVI system 1100 comprises hardware 1101, operating system 1102, virtual layer 1103, slice VNF 1104, performance monitor 1105, smart contract 1106, and MANO 1107. Hardware 1101 comprises a NIC, CPU 1110, GPU 1112, RAM, DRIVE, and DSW. Virtual layer 1103 comprises virtual OS (vOS) 1108, vNIC, vCPU 1109, vGPU 1111, vRAM, vDRIVE, and vSW.

In hardware 1101, CPU 1110 or GPU 1112 executes operating system 1102, vCPU 1109 or vGPU 1111, vOS 1108, and slice VNF 1104. Slice VNF 1104 executes under the control of operating system 1102, vCPU 1109 or vGPU 1112, and vOS 1108. Performance monitor 1105 requests OS and CPU/GPU performance metrics for slice VNF 1104 from operating system 1102 (depending on which microprocessor executes slice VNF 1104). Operating system 1102 responds to the request from performance monitor 1105 with performance data for operating system 1102 and for CPU 1110 or GPU 1112 (depending on which microprocessor executes slice VNF 1104). Performance monitor 1105 requests vOS and vCPU or vGPU performance metrics for slice VNF 1104 from vOS 1108 (depending on which virtual microprocessor executes slice VNF 1104), and vOS 1108 responds to the request from performance monitor 1105 with performance data for vOS 1108 and vCPU 1109 or vGPU 1111 (depending on which virtual microprocessor executes slice VNF 1104).

Performance monitor 1105 transfers the OS, CPU/GPU, vOS, and vCPU/vGPU performance metrics to smart contract 1106. Smart contract 1106 generates a slice health score based on the metrics by comparing the metrics to thresholds and ranges to determine how close the execution of slice VNF 1104 is to expected healthy results. The slice health score may have a CPU/GPU component, OS component, vCPU/vGPU component, and vOS component that are combined into a data string.

Smart contract 1106 determines a slice action based on the slice health score. The slice action may entail using different CPU/GPU, OS, vCPU/vGPU, and/or vOS for slice VNF 1104. Smart contract 1106 indicates the slice action to MANO 1107. MANO 1107 controls hardware 1101, operating system 1102 and virtual layer 1103 to implement the slice action. For example, virtual layer 1103 may use a different vCPU or vGPU when the vCPU or vGPU health score is poor and/or use a different vOS when the vOS health score is poor.

The wireless communication system circuitry described above comprises computer hardware and software that form special-purpose data communication circuitry to manage a wireless network slice. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose data communication circuitry to manage the wireless network slice.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to manage a wireless network slice, the method comprising:

executing an operating system in a microprocessor;

executing wireless network slice software in the microprocessor under control of the operating system;

measuring microprocessor performance when executing the operating system and the wireless network slice software and generating microprocessor measurement data;

measuring operating system performance when the operating system is executing and generating operating system measurement data;

generating wireless network slice information based on the microprocessor measurement data and the operating system measurement data; and modifying the execution of the wireless network slice software based on the wireless network slice information.

2. The method of claim 1 wherein modifying the execution of the wireless network slice software based on the wireless network slice information comprises stopping the execution of the wireless network slice software.

3. The method of claim 1 wherein modifying the execution of the wireless network slice software based on the wireless network slice information comprises executing the wireless network slice software in a different microprocessor.

4. The method of claim 1 wherein modifying the execution of the wireless network slice software based on the wireless network slice information comprises executing the wireless network slice software under control of a different operating system.

5. The method of claim 1 wherein the microprocessor performance data comprises instruction processing metrics, memory usage metrics, and interrupt handling metrics.

6. The method of claim 1 wherein the operating performance data comprises microprocessor usage metrics, memory usage metrics, and network usage metrics.

7. The method of claim 1 wherein generating the wireless network slice information based on the microprocessor measurement data and the operating system measurement data and modifying the execution of the wireless network slice software in response to the wireless network slice information comprises a smart contract in a distributed ledger generating the wireless network slice information based on the microprocessor measurement data and the operating system measurement data and generating an instruction to modify the execution of the wireless network slice software in response to the wireless network slice information.

8. A method to manage a wireless network slice, the method comprising:

executing, by a Central Processing Unit (CPU), an operating system;

executing, by the CPU, wireless network slice software under control of the operating system; and obtaining, by a performance monitor, CPU measurement data that indicates CPU performance during the execution of the operating system and the wireless network slice software;

obtaining, by the performance monitor, operating system measurement data that indicates operating system performance during the execution of the operating system; and receiving, by a smart contract, the CPU measurement data and the operating system measurement data, generating wireless network slice information based on the CPU measurement data and the operating system measurement data, and modifying the execution of the wireless network slice software based on the wireless network slice information.

9. The method of claim 8 wherein modifying, by the smart contract, the execution of the wireless network slice software based on the wireless network slice information comprises transferring an instruction to stop the execution of the wireless network slice software.

10. The method of claim 8 wherein modifying, by the smart contract, the execution of the wireless network slice software based on the wireless network slice information comprises transferring an instruction to execute the wireless network slice software in a different microprocessor.

11. The method of claim 8 wherein modifying, by the smart contract, the execution of the wireless network slice software based on the wireless network slice information comprises transferring an instruction to execute the wireless network slice software under control of different operating system software.

12. The method of claim 8 wherein modifying, by the smart contract, the execution of the wireless network slice software based on the wireless network slice information comprises directing a Management and Orchestration (MANO) system to modify the execution of the wireless network slice software.

13. The method of claim 8 wherein modifying, by the smart contract, the execution of the wireless network slice software based on the wireless network slice information comprises directing a Management and Orchestration (MANO) system to modify the execution of the wireless network slice software and directing, by the MANO system, a Network Function Virtualization Infrastructure (NFVI) to modify the execution of the wireless network slice software.

14. A wireless communication system to manage a wireless network slice, the wireless communication system comprising:

a microprocessor, a performance monitor system, and a network control system;

the microprocessor configured to execute an operating system and to execute wireless network slice software under control of the operating system;

the performance monitor system configured to obtain microprocessor measurement data that indicates microprocessor performance during the execution of the operating system and the wireless network slice software;

the performance monitor system further configured to obtain operating system measurement data that indicates operating system performance during the execution of the operating system;

the network control system configured to generate wireless network slice information based on the microprocessor measurement data and the operating system measurement data; and the network control system further configured to modify the execution of the wireless network slice software based on the wireless network slice information.

15. The wireless communication system of claim 14 wherein the network control system comprises a Management and Orchestration (MANO) system configured to modify the execution of the wireless network slice software based on the wireless network slice information.

16. The wireless communication system of claim 14 wherein the network control system comprises a Network Function Virtualization Infrastructure (NFVI) configured to modify the execution of the wireless network slice software based on the wireless network slice information.

17. The wireless communication system of claim 14 wherein the network control system comprises a smart contract in a distributed ledger configured to generate the wireless network slice information based on the microprocessor measurement data and the operating system measurement data and modify the execution of the wireless network slice software based on the wireless network slice information.

18. The wireless communication system of claim 14 wherein the microprocessor is further configured to stop the execution of the wireless network slice software to modify the execution of the wireless network slice software based on the wireless network slice information.

19. The wireless communication system of claim 14 wherein the microprocessor performance data comprises instruction processing metrics, memory usage metrics, and interrupt handling metrics.

20. The wireless communication system of claim 14 wherein the operating system performance data comprises microprocessor usage metrics, memory usage metrics, and network usage metrics.

* * * * *